United States Patent [19]
Centofante

[11] Patent Number: 5,833,785
[45] Date of Patent: Nov. 10, 1998

[54] ENCLOSING A SMALL-FORMAT ELECTRICAL DEVICE

[75] Inventor: Charles A. Centofante, Los Altos, Calif.

[73] Assignee: Great American Gumball Corporation, Santa Clara, Calif.

[21] Appl. No.: 833,968

[22] Filed: Apr. 11, 1997

Related U.S. Application Data

[62] Division of Ser. No. 722,859, Sep. 26, 1996, abandoned.

[60] Provisional application No. 60/024,002, Aug. 12, 1996.

[51] Int. Cl.$^6$ ..................................................... B32B 31/16
[52] U.S. Cl. .......................... 156/69; 156/73.1; 156/292; 156/309.6; 264/445
[58] Field of Search ............................. 156/69, 73.1, 292, 156/308.2, 309.6, 580.1; 264/442, 443, 445

[56] References Cited

U.S. PATENT DOCUMENTS

| | | | |
|---|---|---|---|
| 1,183,516 | 5/1916 | Anderson | 439/247 |
| 5,108,313 | 4/1992 | Adams | 439/610 |
| 5,194,695 | 3/1993 | Maslakow | 174/52.4 |
| 5,207,586 | 5/1993 | MacGregor et al. | 439/76.1 |
| 5,350,713 | 9/1994 | Liang | 437/217 |
| 5,397,857 | 3/1995 | Farquhar et al. | 174/52.1 |
| 5,411,616 | 5/1995 | Desai et al. | 156/73.1 |
| 5,490,891 | 2/1996 | Farquhar et al. | 156/73.1 |
| 5,502,892 | 4/1996 | Lien | 29/841 |
| 5,564,933 | 10/1996 | Bouchan et al. | 439/76.1 |
| 5,681,409 | 10/1997 | Lin et al. | 156/73.1 |

OTHER PUBLICATIONS

Photographs (4) of an enclosure for a PC card constructed in accordance with standards set by JEDIC and known to applicant to have been in public use more than one year prior to Aug. 12, 1996, the filing date of this application.

*Primary Examiner*—James Sells
*Attorney, Agent, or Firm*—Fish & Richardson P.C.

[57] ABSTRACT

An injection molded plastic housing for, and method of enclosing, an electrical device including placing the device between a housing including a lid member and a base member and joining the lid member and the base member to each other and to a connector attached to the enclosed device. The lid member, base member and connector each may include a means for mating to promote their joining to form an assembled plastic housing with increased structural integrity. The lid member and base member join with the connector in a substantially overlapping relationship that results in a rigid and aesthetically pleasing housing which complies with standards for PC card style devices set by, for example, CFA, PCMCIA, JEDIC, ISO, etc. The inexpensive injection molded plastic material of the housing and the limited number of parts provides for an easily automated, economical method of enclosing electrical devices for use, for example, in computer peripheral and memory applications.

22 Claims, 9 Drawing Sheets

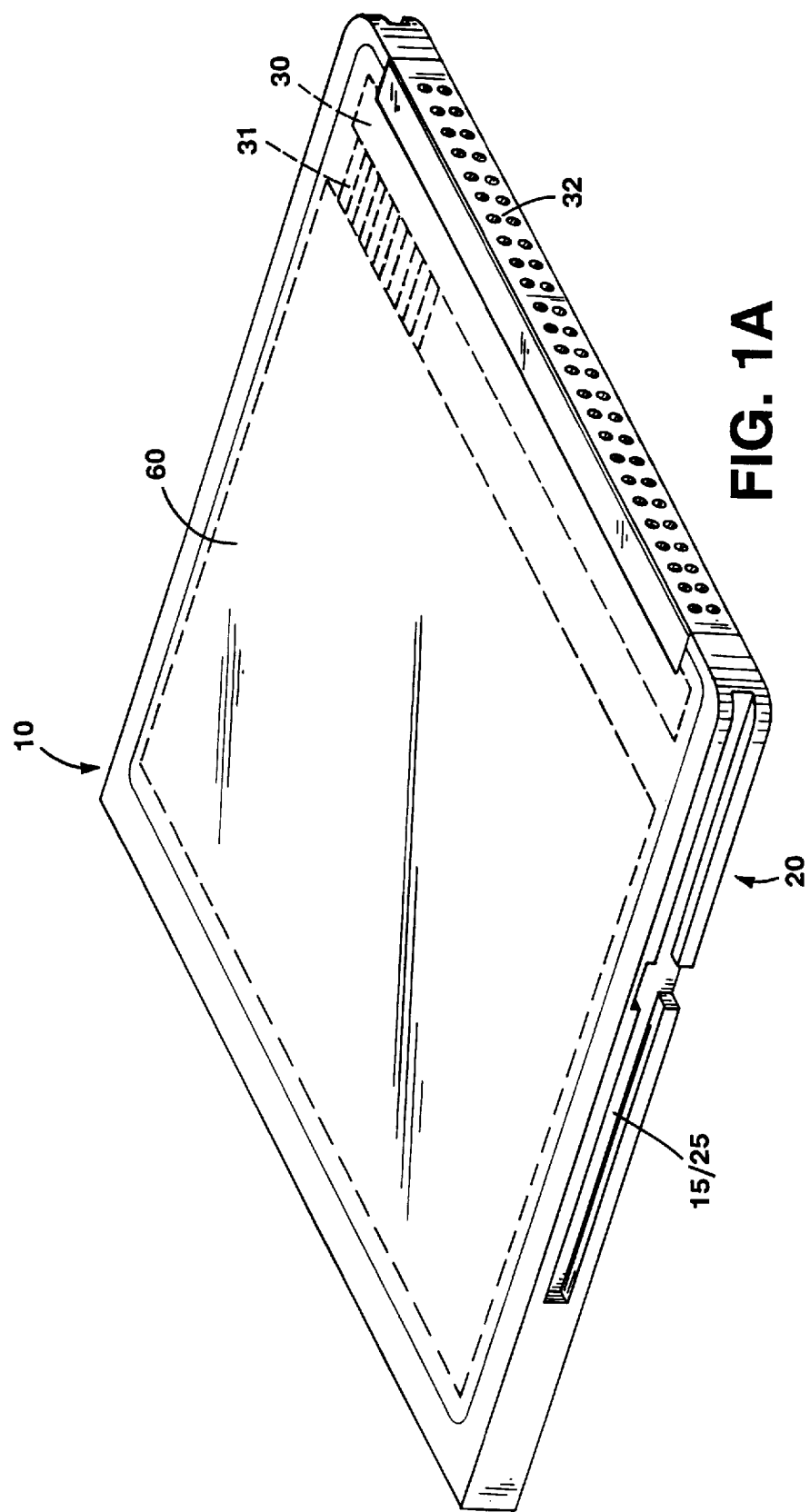

ENCLOSING A SMALL-FORMAT ELECTRICAL DEVICE

This is a divisional of application Ser. No. 08/722,859, filed Sep. 26, 1996, abandoned, which claims the benefit of prior U.S. application Ser. No. 60/024,002, filed Aug. 12, 1996.

BACKGROUND

The invention relates to a housing for, and method of enclosing, small-format electrical devices, and more specifically to plastic housings for devices such as computer peripheral and memory devices.

Computer memory and other peripheral devices are either built into a computer or are external devices which may be selectively attached to the computer through an externally accessible interface. Certain peripheral devices are now small enough to be housed in small, thin, card-shaped packages that are intended to be inserted into specially-designed receptacles typically found in portable personal computers. Other applications for such devices may be found. For example, digital cameras may use flash memory cards instead of film.

Because of the many possible methods of constructing the interface between the computer and such devices, standards have been developed by the Personal Computer Memory Card International Association ("PCMCIA"), JEDIC, International Organization for Standardization ("ISO"), Compact Flash Association ("CFA"), and others. Standards specify the shape and size of the device housing as well as the design of the connector/computer interface. Devices conforming to these standards are generally referred to as "PC card" devices.

PC card devices should be sealed within a strong, rigid package. Attempts were made in the past to provide an all-plastic housing for these devices. These attempts were unsuccessful because of the inability to manufacture plastic pieces thin enough to meet the size constraints of the standard and still provide the required structural integrity. One prior art housing attempted to solve the thickness problem by cutting a notch in the housing around the device connector. However, the resulting enclosure lacked the required rigidity, was prone to failure, and had a visible gap between the connector and the housing that was unsightly and exposed the device to external contaminants.

The current practice is to use metal containers, or metal and plastic containers such as the one disclosed in U.S. Pat. No. 5,397,857. Although this package provides the necessary rigidity, it requires expensive metal parts and multiple steps to manufacture and assemble.

SUMMARY

In general, in one aspect, the invention provides a kit for making a card-shaped housing to enclose a device, the completed housing having a lid and a base defining the flat surfaces of the card and a shallow side wall joining the lid and base at their edges and the side wall having an opening for a connector. The kit includes an injection molded plastic lid member composing a lid section and a lid edge section including a portion of the shallow side wall of the housing and an injection molded plastic base member composing a base section and a base edge section including a complementary portion of the side wall of the housing, where both lid section and base section include a means for mating to the connector in the region of the opening in the side wall of the housing. In another aspect, the invention provides a card-shaped housing enclosing an electrical device attached to a connector including an injection molded plastic lid and base that define the flat surfaces of the card, a shallow side wall joining the lid and base at their edges and having an opening for the connector, and where both lid and base are mated to the connector. In another aspect, the invention provides a method for enclosing an electrical device having an attached connector in an injection molded plastic housing where the device is placed between the lid and base of the housing with the connector in a space formed by overlapping regions of the lid and base and where the lid and the base are joined to each other and to the connector. In another aspect, the invention provides a connector for use at an edge of a plastic housing for electrically connecting a device at the back of the connector to an interface, where the connector has a plastic body including a face and a back which holds a conductor extending from the face to a connection point for the device toward the back of the connector, where the conductor passes between a first and a second parallel surface defined by the plastic body behind the face and where the first and second surfaces are separated by about 0.100 inches or less.

Preferred embodiments of the invention include one or more of the following features. The housing has a means for mating that includes at least one raised member that engages with the connector. The means for mating includes at least one substantially conical raised member. The means for mating includes a plurality of raised members that fit in a corresponding plurality of recesses in the connector. The means for mating includes raised members that are elongated and substantially parallel, are about 0.010 inches high, about 0.030 inches wide and about 0.150 inches long and are placed so that they extend lengthwise from the opening in the side wall toward the interior of the housing. The means for mating includes raised members that are substantially rectangular in transverse cross-section with a substantially flat interior surface substantially parallel to the lid and facing the connector and side areas that are tapered near the interior surface so that the width of the interior surface is at least about 0.008 less than the width of the member. The means for mating includes a region of reduced thickness relative to the thickness of the lid and base. The means for mating includes a raised member adjacent and substantially parallel to the rear edge of a region of reduced thickness. The form factor of the housing conforms to a standard selected from the group of standards set by PCMCIA, JEDIC, CFA, and ISO. The housing includes a lid edge section and a base edge section each have a mating surface including entry gates for injection molding the plastic of the lid and base. The connector has a face that is configured to conform to a standard interface selected from the group of standards consisting of PCMCIA, JEDIC, CFA and ISO. The connector has a means for mating to the housing. The lid and base are joined to each other and to the connector by sonic welding, adhesive, the application of heat or by chemical reaction.

Among the advantages of the invention are one or more of the following. The housing is easily and economically manufactured by injection molding plastic. The simple and versatile package may be easily and automatically assembled. The housing is inexpensive yet provides sufficient structural integrity in an aesthetically pleasing package. A connector may be integrated into a strong, rigid, plastic housing. The housing may be assembled without adhesives. The housing is easy to mark or label because inks and other substances adhere to the plastic housing material better than to prior art metal housings.

Other features and advantages of the invention will become apparent from the following description and from the claims.

BRIEF DESCRIPTION OF THE DRAWINGS

FIG. 1A is a view the housing of FIG. 1 in its final, assembled form.

DETAILED DESCRIPTION

Figure 1:
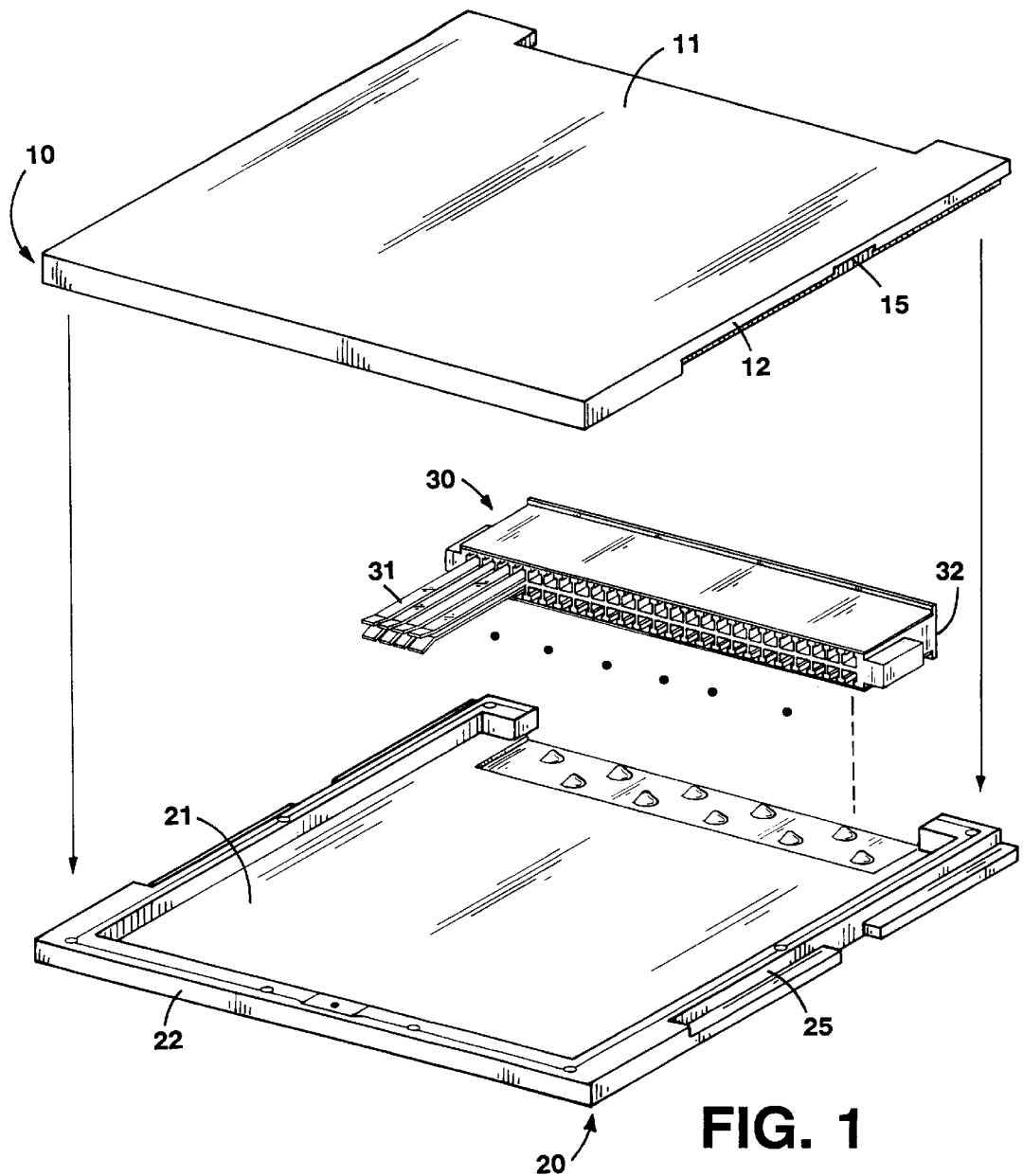
FIG. 1 is an exploded view of a housing.

Referring to FIG. 1, the unassembled parts of a housing include: a lid member 10, a base member 20 and a connector 30. The lid member 10 includes a lid section 11 and a lid edge section 12. The lid edge section 12 extends along all of three sides of lid section 11 and a portion of the fourth side, with an opening left for connector 30. Lid edge section 12 thus makes up a portion of a side wall of the assembled housing. The base member 20 includes a base section 21 of the housing and a base edge section 22, that also extends along all of three sides of base section 21 and a portion of a fourth side, and includes a complementary portion of the side wall of the housing. The lid edge section 12 and base edge section 22 are shown in a form in accordance with the CFA standards and therefore some additional features are shown, including insertion guides 15 and 25, that are unique to that specific application and well known and therefore will not be further discussed.

The connector 30 is electrically coupled to an electrical device (not shown) by a plurality of pins 31. Pins 31 extend across the entire width of connector 30 but, for the sake of clarity, only a portion of the pins are shown in the figures. The configuration of pins 31 and the details of the various methods of attaching them to an electrical device are well known in the art. Pins 31 are also coupled to an interface (not shown) in the face 32 of connector 30. This interface may be selected from the group of standard interfaces set by CFA, PCMCIA, JEDIC, ISO, or others.

When assembled, the housing is substantially card-shaped, with lid section 11 and base section 21 defining the flat surfaces of the card and includes a shallow side wall made up of lid edge section 12 and base edge section 22 with an opening in one end for connector 30. During assembly, connector 30 is positioned between lid member 10 and base member 20 and lid member 10 and base member 20 are joined to each other and to connector 30. It is through this joining of all three components that a rigid housing with the required structural integrity is formed.

Referring to FIG. 1A, lid member 10 is joined to base member 20 and to connector 30 to form a completed housing. This joining is advantageously accomplished by use of a mating means included in lid member 10 and base member 20 and by sonic welding lid member 10 and base member 20 to each other and to connector 30. A small-format electrical device 60 is shown in outline form attached to pins 31 of connector 30 and enclosed inside the assembled housing. An embodiment of the interface at face 32 and of the complete insertion guide (15 and 25) may be more clearly seen in FIG. 1A.

Figure 2:
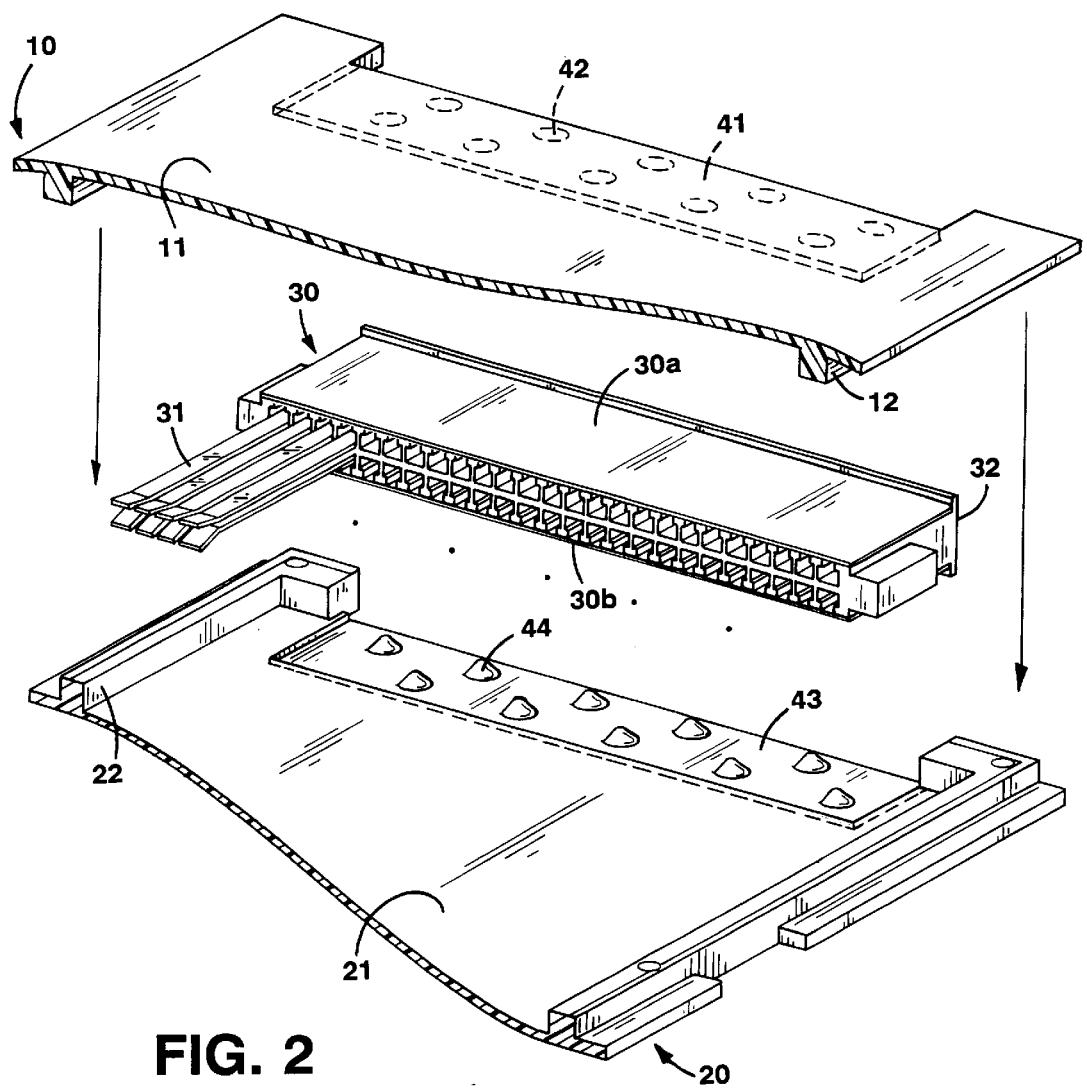
FIG. 2 is a detailed view of the mating means of the housing of FIG. 1.

Referring to FIG. 2, connector 30 is a standard, unmodified connector. Connector 30 includes a first parallel surface 30a and a second parallel surface 30b that are continuous surfaces and are defined by the body of connector 30 behind its face 32. Pins 31 extend from an interface (not shown) in face 32, pass between first and second parallel surfaces 30a and 30b and attach to a small-format electrical device (not shown) at a point toward the back of connector 30. Lid member 10 and base member 20 further include a means for mating to connector 30. The mating means of lid member 10 includes a region of reduced thickness 41 in lid section 11 and at least one raised member 42, i.e., member 42 is raised relative to the under surface of lid section 11 and extends downwardly in the orientation shown in FIG. 2. Raised member 42 projects sufficiently to engage first parallel surface 30a of connector 30. Base member 20 also includes a region of reduced thickness 43 with at least one raised member 44, which is raised from the inner surface of base section 21 sufficiently to engage second parallel surface 30b of connector 30. In practice, there may be several members 42 spaced throughout the region of reduced thickness 41 of lid section 11 and several members 44 spaced throughout the region of reduced thickness 43 of base section 21.

The shape of the raised members is not critical and may be, for example, conical as shown, hemispherical, cubical, cylindrical, rectilinear, pyramid-shaped or of other configurations. In one embodiment of a CFA housing, the regions of reduced thickness 41 and 43 are about 0.012 inches thick, conical members 42 and 44 are about 0.020 inches in diameter at their base and about 0.008 inches high. Outside of the regions of reduced thickness 41 and 43, lid section 11 and base section 21 are themselves about 0.020 inches thick.

Figure 2A:
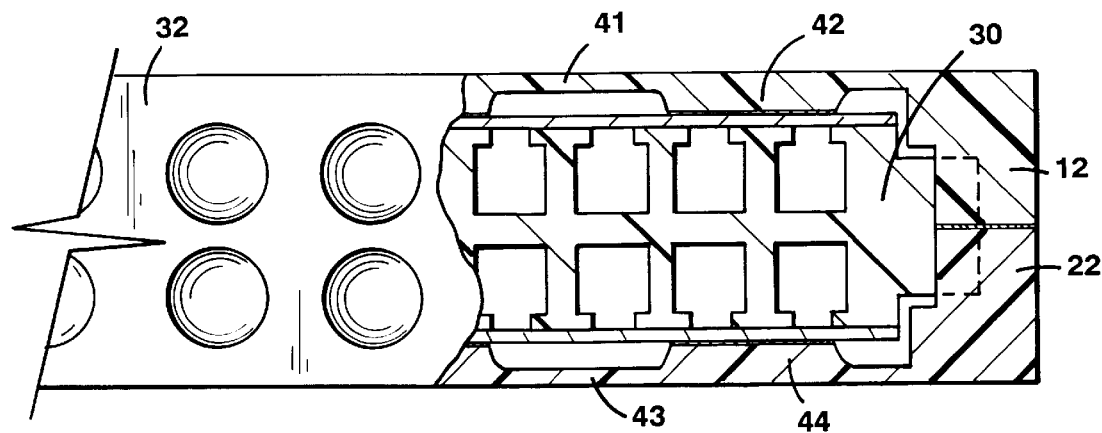
FIG. 2A is a more detailed view of the mating means and connector of FIG. 2 after assembly.

Referring to FIG. 2A, when assembled with the electrical device in place, the regions of reduced thickness 41 and 43 overlap and mate with connector 30 behind its face 32 so that raised members 42 and 44 come in contact with connector 30. Also, lid edge section 12 mates with base edge section 22. When constructed of a suitable thermoplastic material, the parts may then be joined together by sonic welding such that raised members 42 and 44 partially melt and flatten, as shown, forming a strong bond with connector 30. Lid edge section 12 and base edge section 22, under pressure supplied during the welding process, also partially melt and merge to form the solid side wall of the completed housing. The bonding of lid member 10 and base member 20 to each other and to connector 30 results in a rigid housing completely enclosing the electrical device (not shown) wherein connector 30 is held firmly in place.

The joining of the parts of the housing is advantageously accomplished by sonic welding. The various techniques of this method, including the use of shear welds and energy directors, is well known in the art and need not be further discussed as the particular sonic welding technique is not critical.

Figure 3:
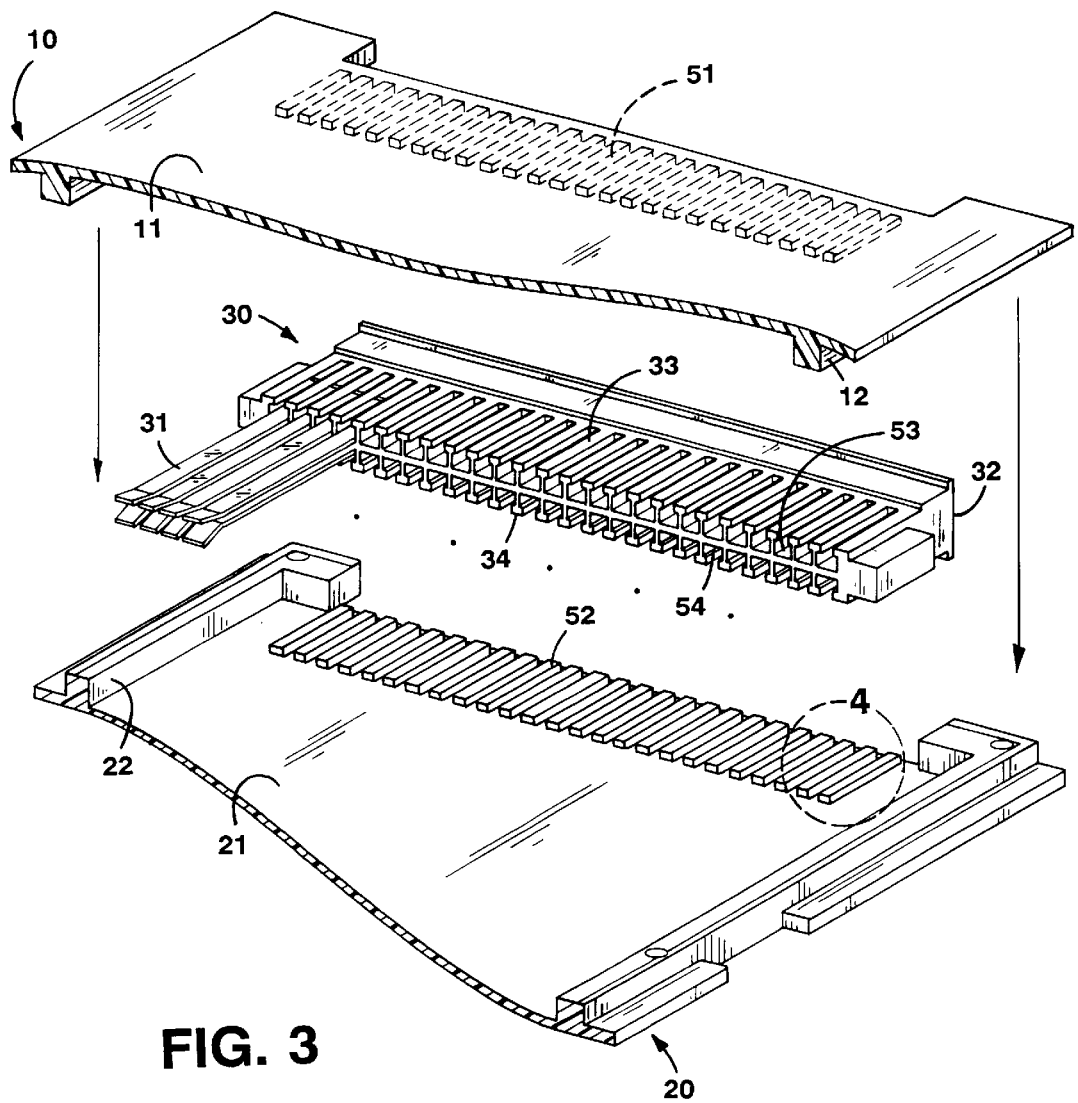
FIG. 3 is a detailed view of a second embodiment of the mating means.

Referring to FIG. 3, the means for mating includes a plurality of substantially parallel raised members 51 located on the inner surface of lid section 11. The means for mating further includes a plurality of substantially parallel raised members 52 located on the inner surface of base section 21. Connector 30 includes a first parallel surface 33 and a second parallel surface 34 that are defined by the body of connector 30 behind its face 32. Unlike the standard connector shown in FIG. 2, the first and second parallel surfaces 33 and 34 of connector 30 of the embodiment of FIG. 3 are discontinuous and include recesses 53 and 54, respectively. Like the standard connector, however, pins 31 extend from an interface (not shown) in face 32, pass between first and second parallel surfaces 33 and 34 and attach to an electrical device (not shown) at a point toward the back of connector 30.

The means for mating of FIG. 3 further includes a plurality of recesses 53 in the first parallel surface 33 of connector 30 that correspond to the plurality of raised members 51 in lid section 11, and a second plurality of recesses 54 in second parallel surface 34 that correspond to the plurality of raised members 52 in base section 21.

Figure 3A:
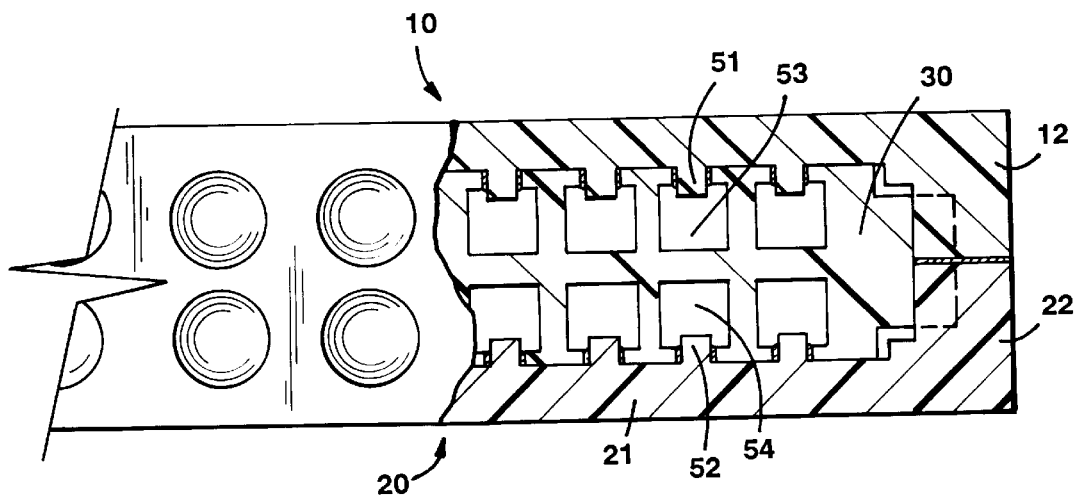
FIG. 3A is a more detailed view of the mating means and connector of FIG. 3 after assembly.

Referring to FIG. 3A, when base, lid, and connector are assembled, the raised members 51 are seated in the plurality of recesses 53 so that lid member 10 mates with connector 30 in an interlocking-type arrangement. The raised members 52 of base section 21 mate with corresponding recesses 54 of connector 30 in the same fashion. With an electrical device in position (not shown), lid member 10 and base member 20 are then permanently joined to each other and to connector 30 by sonic welding, adhesive, application of heat or other method, to form a rigid integrated housing in which connector 30 is held firmly in place. As shown in FIG. 3A, when lid member 10, base member 20 and connector 30 are constructed of a suitable thermoplastic material, the sonic welding process partially melts raised members (51 and 52), bonding them to the corresponding recesses (53 and 54) in connector 30. Again, lid edge section 12 and base edge section 22, under pressure supplied during the welding process, also partially melt and merge to form the solid side wall of the completed housing.

Figure 4:
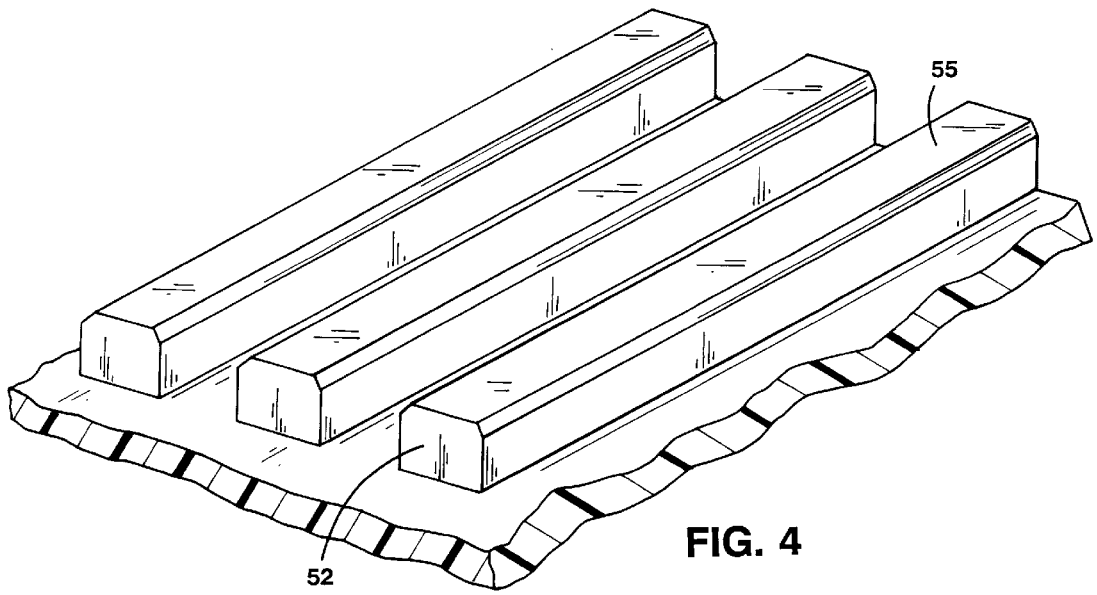
FIG. 4 is a more detailed view of a portion of the mating means of FIG. 3.

FIG. 4 provides a more detailed view of an example of raised members 52. As shown, raised member 52 is elongated and of substantially rectilinear shape. Raised member 52, however, is not perfectly rectangular in transverse cross-section but is tapered. This tapering results in an interior surface 55 facing toward the corresponding recess 54 in connector 30 having a reduced width relative to the overall width of the raised member 52. The tapering of member 52 provides the improvements of making automatic assembly easier (raised member 52 will seat more easily in corresponding recess 54) and an improved profile better suited to sonic welding. It has been found that a reduction in width of about 0.008 inches from the overall width of raised member 52 is sufficient to provide the advantageous taper.

The number and configuration of raised members 51 and 52 and recesses 53 and 54 may be altered in many ways. The raised members may, for example, be hemispherical in shape and correspond to dimple-like recesses; square post-like raised members may fit in corresponding square holes; round pegs in round holes; and the like. Many other combinations of raised member/recess configurations may be devised that will serve the purposes of providing a means for mating formations of lid member 10 and base member 20 to corresponding formations of connector 30.

The mating means may also be formed by reducing the distance between first parallel surface 33 and second parallel surface 34 to allow connector 30 to be mated to a lid section 11 and base section 21 each having substantially uniform thickness. The reduction of the distance between first parallel surface 33 and second parallel surface 34 of connector 30 allows for a lid section 11 and base section 21 that may be thicker and therefore more structurally sound, yet still allow the overall thickness of the assembled housing to conform to the strict dimensional requirements of PC card applications. It has been found that a tough, rigid housing that conforms to the CFA standard may be assembled by sonic welding together a lid member 10 having a lid section 11 about 0.020 inches thick and a base member 20 having a base section 21 also about 0.020 inches thick and a connector 30 having a first parallel surface 33 and a second parallel surface 34 that are separated by about 0.100 inches.

Referring to FIG. 5, connector 30 is again a standard, unmodified connector. The means for mating in the lid member 10 of this embodiment comprises a region of reduced thickness 41 in lid section 11. The means for mating further comprises a raised "stop" member 45 that is adjacent and substantially parallel to the rear edge of the region of reduced thickness 41. Stop member 45 may be solid or broken, rectilinear, triangular, semi-cylindrical, or other shape. Base member 20 includes its own region of reduced thickness 43 and raised stop member 46.

Figure 5A:
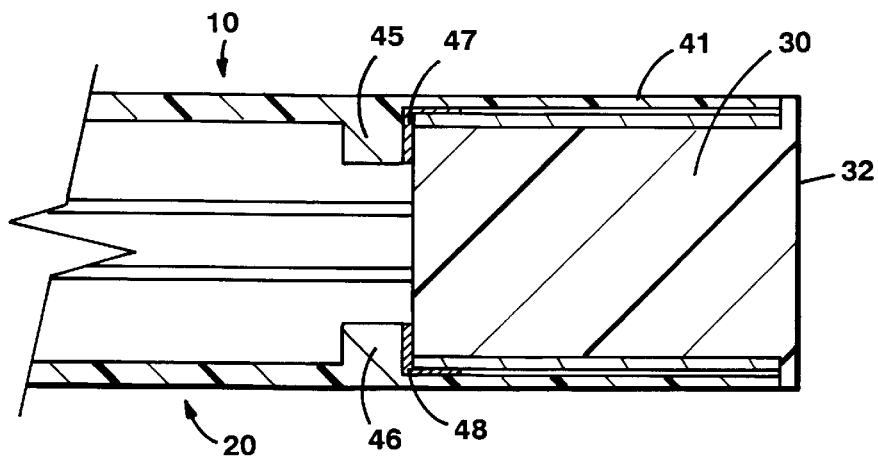
FIG. 5A is a more detailed view of the mating means and connector of FIG. 5 after assembly.
Figure 5:
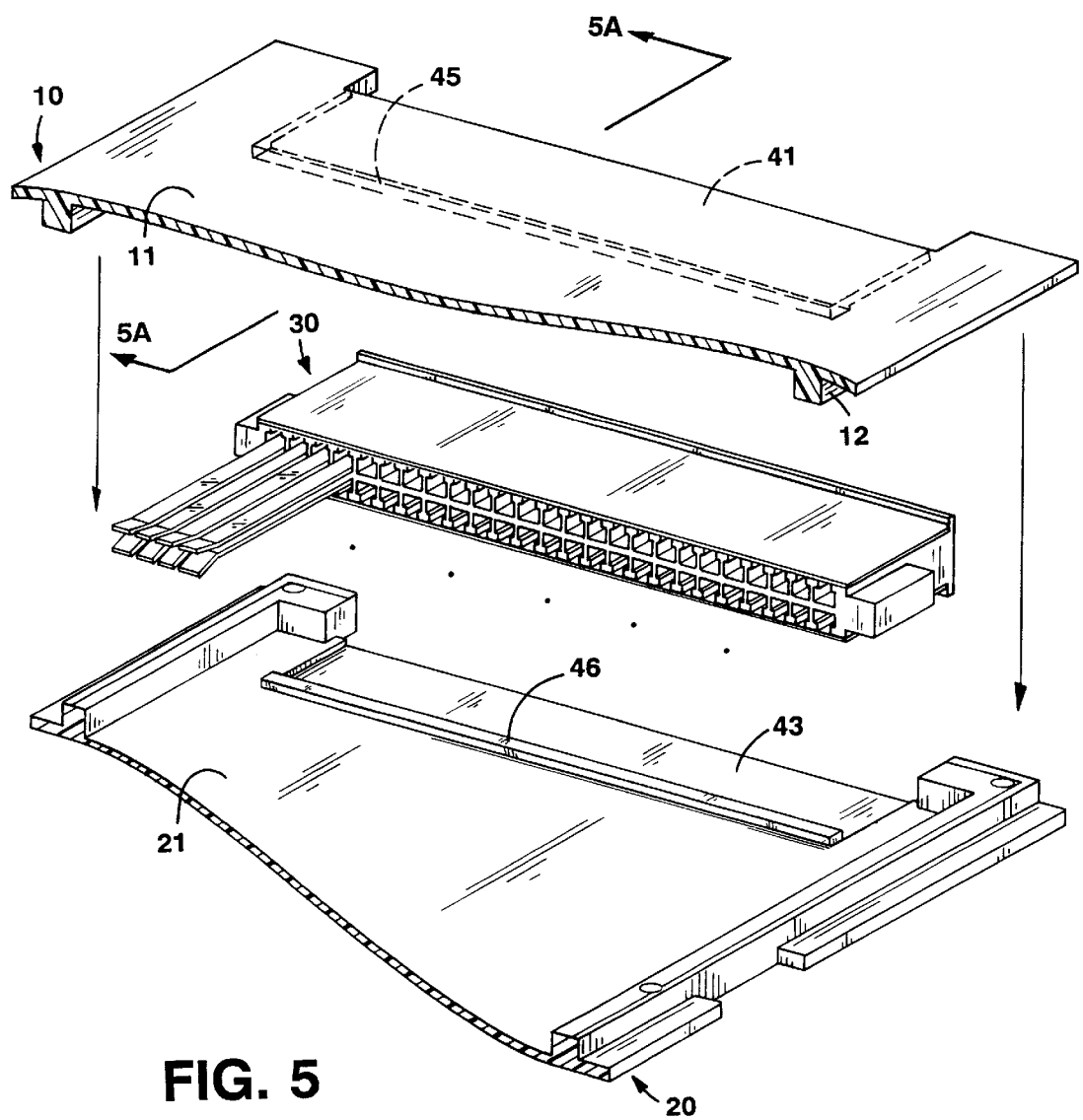
FIG. 5 is a detailed view of a third embodiment of the mating means.

Referring to FIG. 5A, when lid, base, and connector are assembled, the region of reduced thickness 41 overlaps connector 30 behind its face 32 and stop member 45 abuts the back of connector 30. Base member 20 and connector 30 fit together in a similar fashion. Lid member 10 and base member 20 are joined to connector 30 by their respective stop members 45 and 46 either by sonic welding, adhesive, heat or other method. This joining is represented by the cross-hatched regions (47 and 48) in FIG. 5A, which are localized at the stop members (45 and 46).

Figure 6:
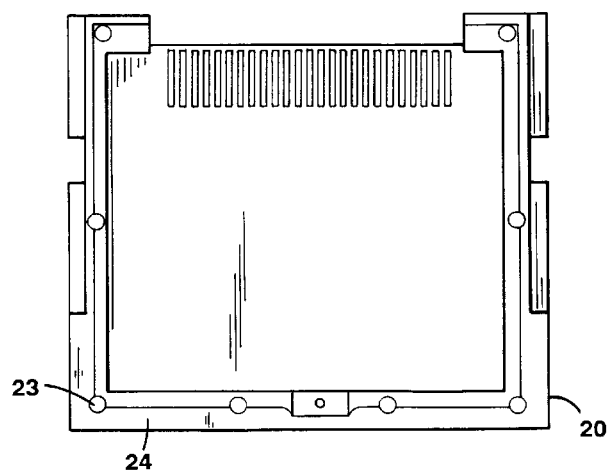
FIG. 6 is a plan view of a portion of an embodiment of a housing detailing additional aspects.

Referring to FIG. 6, base member 20 is constructed of injection molded plastic. When a part is injection molded, the plastic enters the mold through entry points called gates. According to conventional techniques, after a part is molded, it is typically necessary to mill the part to remove excess material that may be located at the gate points in the finished product. According to a further aspect of the invention, however, base member 20 is injection molded so that the gate points 23 are located in mating surface 24 of base edge section 22. Lid member 10 is molded in a similar fashion. When assembled, gate points 23 are hidden inside the finished housing and therefore there is no need to mill away any excess material. Accordingly, an additional step may be removed from the process of assembling finished housings and provide a further savings in manufacturing time and cost.

Figure 7:
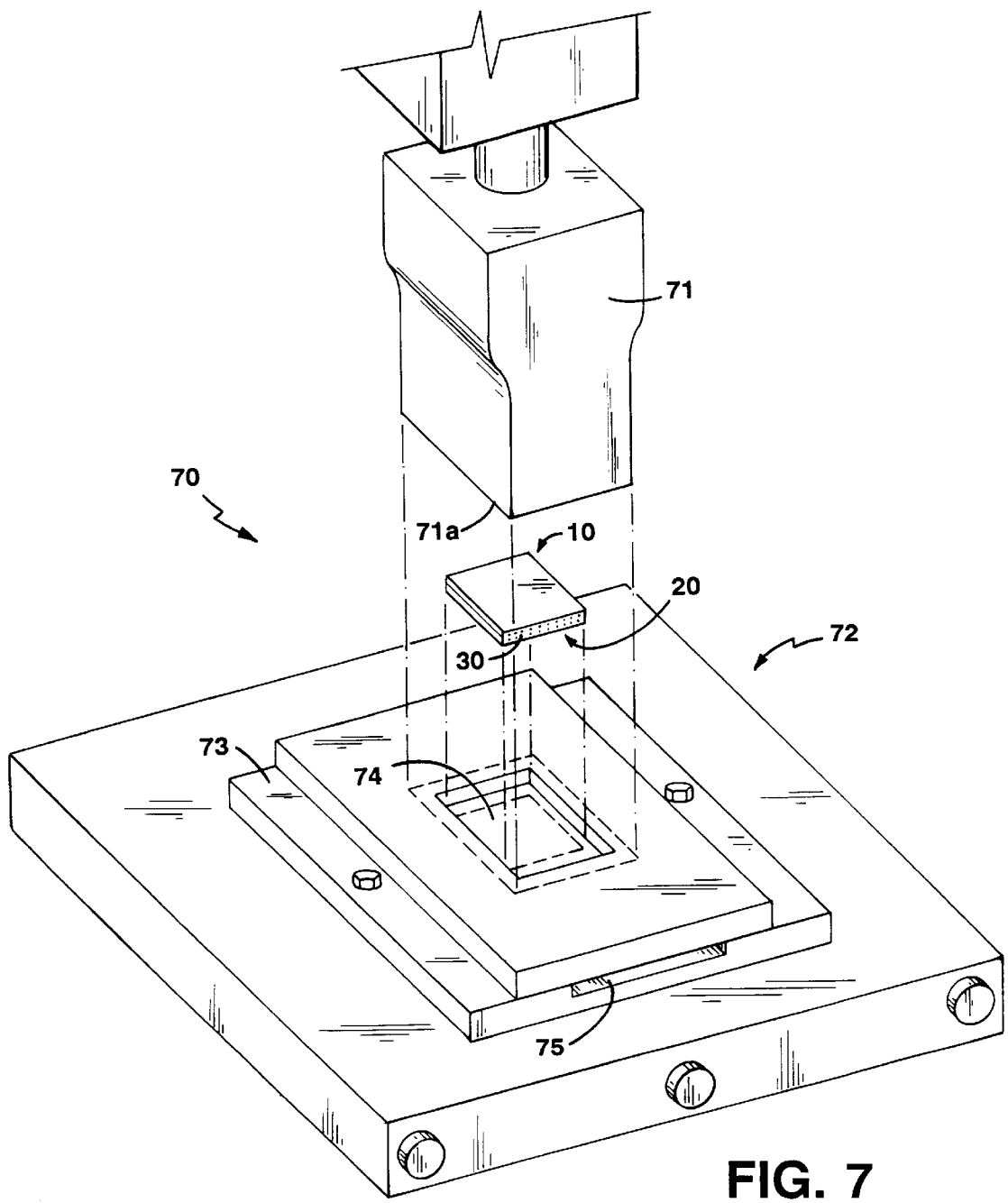
FIG. 7 is a diagram of an embodiment of the housing in place to be joined by a sonic welding apparatus.

Referring to FIG. 7, a sonic welding apparatus 70 useful for assembling a housing is diagrammatically represented. Such an apparatus is well known and is commercially available from, for example, Branson Ultrasonics Corp. of Danbury Conn. Horn 71 is situated over base 72. Holding fixture 73 is disposed on base 72. Holding fixture 73 includes well 74 for holding the components of a housing to be assembled. Holding fixture 73 preferably also includes calibration slot 75. Calibration slot 75 allows the insertion of base plates (not shown) of various thicknesses to alter the depth of well 74. This allows the same sonic welding apparatus 70 to be used to weld housings of various sizes and configurations.

In practice, lid member 10, base member 20 and connector 30 are arranged together with their mating means aligned properly and are placed in well 74, which has been configured such that the lid member 10 extends above the surface of holding fixture 73. Horn 70 is then lowered so that its flat under-surface 71a comes in contact with lid member 10. Horn 70 applies downward pressure and ultrasonic energy to the housing, which results in the permanent joining of lid member 10, base member 20 and connector 30 into an integrated housing. Although shown mounted to base 72, holding fixture 73 may be movably mounted on a suitable platform, a rotating table, for example, such that a plurality of holding fixtures may be continuously and automatically positioned under horn 70, thereby increasing the efficiency of the welding process.

Other embodiments are within the scope of the following claims. For example, the embodiments disclosed in the figures and discussed above show a housing conforming to the standards of the Compact Flash Association (CFA). The invention applies more generally, however, to housings for small-format devices including, for example, those complying with the standards of PCMCIA, JEDIC, ISO, and others. The joining of lid member, base member and connector may also be accomplished with techniques other than sonic welding such as, for example, with adhesives, by the application of heat, with a chemical reaction, or by other methods. Adhesives that may useful for joining the components of the housing are, for example, thermosetting resins and thermoplastic resins. Further, the housing may be constructed of a variety of injection molded plastic materials including, for example, thermoplastic resins such as polycarbonate, acrylic and others, and thermosetting resins such as epoxy, silicone, and others. In each case, care is to be taken to choose compatible materials for parts to be joined and the joining system.

What is claimed is:

1. A method of enclosing in a plastic housing an electrical device having an attached connector with a plastic body including a face, the housing when assembled including a lid member and a base member each made of injection molded plastic and each having a region for overlapping the body of the connector behind the face, the method comprising:

placing the device between the lid member and the base member of the housing with the connector in the space formed by the overlapping regions; and joining the lid member and the base member to each other and to the connector.

2. The method of claim 1, wherein the joining is done by sonic welding.

3. The method of claim 2, wherein the joining is accomplished with a shear weld.

4. The method of claim 2, wherein the joining is accomplished with energy directors.

5. The method of claim 1, wherein the joining is done by adhesive.

6. The method of claim 5, wherein the adhesive is chosen from the group of thermoplastic resins and thermosetting resins.

7. The method of claim 1, wherein the joining is done by a chemical reaction.

8. The method of claim 1, wherein the overlapping region of the lid member and base member include a means for mating to the connector.

9. The method of claim 8, wherein the means for mating comprises a plurality of raised members that fit in a corresponding plurality of recesses in the connector.

10. The method of claim 8, wherein the means for mating comprises a region of reduced thickness relative to the thickness of the lid member and base member.

11. The method of claim 10, wherein means for mating further comprises at least one raised member located in the region of reduced thickness.

12. The method of claim 10, wherein the means for mating further comprises:

a rear edge along the region of reduced thickness opposite and parallel to the opening in the side wall; and a raised member adjacent and substantially parallel to the rear edge, where the raised member has a thickness greater than the thickness of the lid member and wherein the lid member and base member are joined to the connector by the raised member.

13. The method of claim 10, wherein the region of reduced thickness is about 0.012 inches thick.

14. The method of claim 10, wherein means for mating further comprises at least one substantially conical raised member located in the region of reduced thickness.

15. A method of enclosing an electrical device having an attached connector, the connector having a plastic body including a face, the method comprising:

providing a plastic housing, the housing when assembled including a lid member and a base member each made of injection molded plastic, the lid member and the base member each having a region adapted to overlap the body of the connector behind the face of the connector;

placing the device between the lid member and the base member of the housing with the connector in the space formed by the respective overlapping regions; and joining the lid member and the base member permanently to each other and joining both the lid member and the base member permanently to the connector.

16. The method of claim 15, wherein:

the joining is done by sonic welding; and the overlapping region of the lid member and base member each include a means for mating to the connector.

17. The method of claim 16, wherein the means for mating comprises a plurality of raised members adapted to fit in a corresponding plurality of recesses in the connector.

18. The method of claim 16, wherein the means for mating comprises a region of reduced thickness relative to the thickness of the lid member and base member.

19. The method of claim 18, wherein the means for mating further comprises:

a rear edge along the region of reduced thickness opposite and parallel to the opening in the side wall; and a raised member adjacent and substantially parallel to the rear edge, where the raised member has a thickness greater than the thickness of the lid member and wherein the lid member and base member are joined to the connector by the raised member.

20. The method of claim 18, wherein means for mating further comprises at least one raised member located in the region of reduced thickness.

21. The method of claim 20, wherein the region of reduced thickness is about 0.012 inches thick.

22. The method of claim 20, wherein means for mating further comprises at least one substantially conical raised member located in the region of reduced thickness.

* * * * *